(12) United States Patent
Handa

(10) Patent No.: US 8,919,597 B2
(45) Date of Patent: Dec. 30, 2014

(54) GAS TANK

(75) Inventor: Kiyoshi Handa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/505,789

(22) PCT Filed: Oct. 26, 2010

(86) PCT No.: PCT/JP2010/068913
§ 371 (c)(1),
(2), (4) Date: May 3, 2012

(87) PCT Pub. No.: WO2011/055652
PCT Pub. Date: May 12, 2011

(65) Prior Publication Data
US 2012/0217251 A1    Aug. 30, 2012

(30) Foreign Application Priority Data
Nov. 6, 2009    (JP) ................................ 2009-255096

(51) Int. Cl.
*F17C 1/02*    (2006.01)
*F17C 13/08*   (2006.01)
*H01M 8/04*    (2006.01)
*B60K 15/03*   (2006.01)
*B60K 15/07*   (2006.01)
*B60K 1/00*    (2006.01)

(52) U.S. Cl.
CPC ..... *H01M 8/04201* (2013.01); *B60K 15/03006* (2013.01); *B60K 15/07* (2013.01); *F17C 13/084* (2013.01); *B60K 15/03* (2013.01); *B60K 1/00* (2013.01); *B60K 2015/03039* (2013.01);

(Continued)

(58) Field of Classification Search
CPC ................ F17C 1/16; F17C 1/12; F17C 1/04; F17C 2203/0329; F17C 1/02; F17C 2203/0609; F17C 2203/0602
USPC ......... 220/586, 588, 581, 562, 592.25, 592.2, 220/62.15; 206/0.6
See application file for complete search history.

(56) References Cited

U.S. PATENT DOCUMENTS 3,313,020 A * 4/1967 Krauskopf ................... 29/455.1
3,361,285 A * 1/1968 Alleaume .................. 220/592.2

(Continued)

FOREIGN PATENT DOCUMENTS

DE    1 165 953 B    3/1964
DE    2101 075 A1    8/1972

(Continued)

OTHER PUBLICATIONS
Translation of JP 2005238976 (Taniguchi) Sep. 8, 2005.*

(Continued)

*Primary Examiner* — Robert J Hicks
(74) *Attorney, Agent, or Firm* — Squire Patton Boggs (US) LLP

(57) ABSTRACT

Provided is a gas tank wherein the pressure of gas filled in the tank hardly increases. A hydrogen tank (1) includes: a container main-body (10) into which hydrogen is filled; a first thermal-foam heat insulation layer (21) provided on the outer surface (11) of the container main-body (10); a belt fitting region (16) virtually provided at a portion of the outer surface (11) of the container main-body (10); a belt (31), wherein the back surface (35) being a part of the surfaces of the belt (31) is in contact with the belt fitting region (16), and wherein the belt (31) is fixed to a vehicle body (141) so that the container main-body (10) is fixed to the vehicle body (141); and a second thermal-foam heat insulation layer (41) provided on a surface of the belt (31) other than the back surface (35).

4 Claims, 7 Drawing Sheets

(52) U.S. Cl.
CPC ............... B60K 2015/03046 (2013.01); F17C 2201/0109 (2013.01); F17C 2201/056 (2013.01); F17C 2203/0329 (2013.01); F17C 2203/0604 (2013.01); F17C 2203/0607 (2013.01); F17C 2203/0619 (2013.01); F17C 2203/0646 (2013.01); F17C 2203/0663 (2013.01); F17C 2205/0126 (2013.01); F17C 2205/0157 (2013.01); F17C 2205/0326 (2013.01); F17C 2221/011 (2013.01); F17C 2221/014 (2013.01); F17C 2221/033 (2013.01); F17C 2225/0123 (2013.01); F17C 2225/036 (2013.01); F17C 2260/021 (2013.01); F17C 2270/0168 (2013.01); F17C 2270/0173 (2013.01); F17C 2270/0184 (2013.01); F17C 2270/0189 (2013.01); H01M 2250/20 (2013.01); Y02E 60/321 (2013.01); Y02E 60/50 (2013.01); Y02T 90/32 (2013.01)
USPC .......................... 220/586; 220/562; 220/581

(56) References Cited

U.S. PATENT DOCUMENTS

| | | | | |
|---|---|---|---|---|
| 3,458,608 | A * | 7/1969 | Cynoski et al. | 264/45.6 |
| 3,753,848 | A * | 8/1973 | Bennett | 428/179 |
| 4,075,264 | A * | 2/1978 | Hay, II | 264/46.5 |
| 5,082,138 | A * | 1/1992 | McGarvey | 220/560.01 |

FOREIGN PATENT DOCUMENTS

| | | | | |
|---|---|---|---|---|
| DE | 3601955 A1 * | 7/1987 | | F16L 59/12 |
| DE | 10 2006 029 575 A1 | 12/2007 | | |
| JP | 2005-238976 A | 9/2005 | | |
| JP | 3118381 U | 1/2006 | | |
| JP | 2008-291906 A | 12/2008 | | |
| JP | 2009-054474 A | 3/2009 | | |
| JP | 2001-130271 A | 5/2011 | | |

OTHER PUBLICATIONS

Translation of JP 2009054474 (Tange et al.) Mar. 12, 2009.*
Translation of DE3601955 (Zaiser), Jul. 30, 1987, pp. 3-4.*
International Search Report and Written Opinion corresponding to International Application No. PCT/JP2010/068913 dated Jan. 11, 2011 and English translation of International Search Report.
European Search Report for corresponding European Patent Appln. No. 10 828 212.0.

* cited by examiner

< Normal state (before foaming) >

< After foaming >

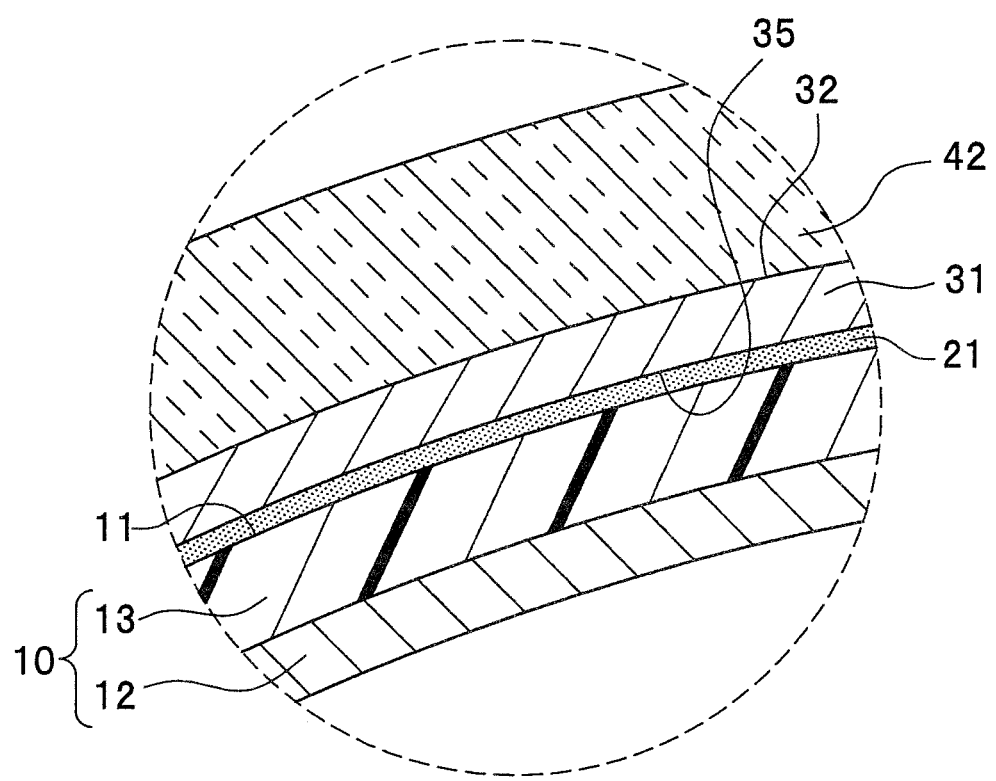

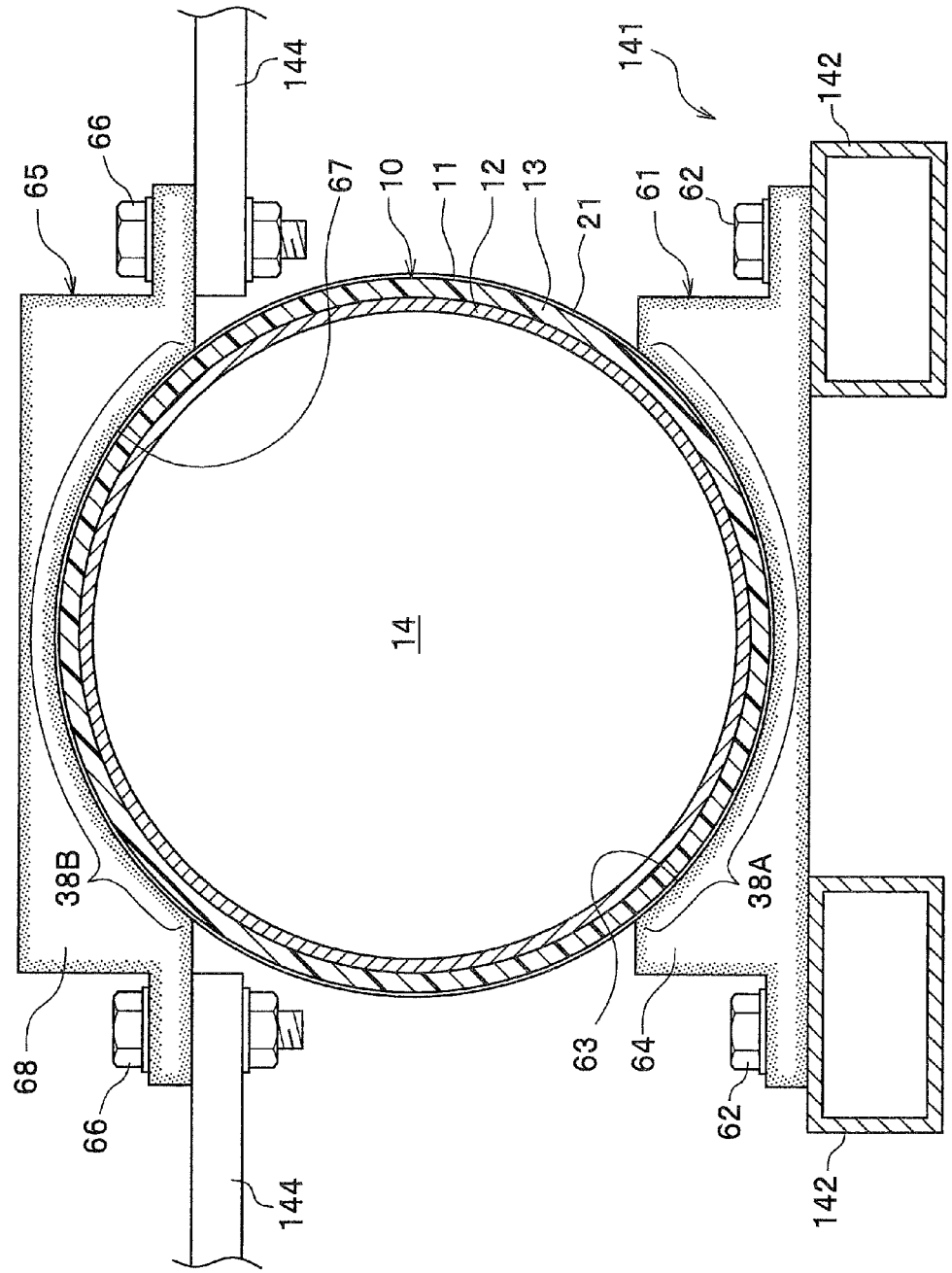

GAS TANK

TECHNICAL FIELD

The present invention relates to a gas tank.

BACKGROUND ART

In recent years, fuel cell vehicles which have a fuel cell (a fuel cell stack) mounted thereon and run by the power of the fuel cell have been developed. On such a fuel cell vehicle, there are also mounted, in addition to a fuel cell, a hydrogen tank (gas tank) for supplying hydrogen (fuel gas) to the fuel cell, a compressor for supplying air, a refrigerant pump for circulating refrigerant through the fuel cell, a PDU (Power Drive Unit) for converting a direct current power into an alternative current power, a motor for driving, a drive train for transmitting the drive force of the motor to drive wheels, and the like.

Herein, the external units including the compressor, the refrigerant pump, the PDU, and the drive train generate heat, accompanying the operations thereof.

Hydrogen is filled in the hydrogen tank at a high pressure. Further, a hydrogen supply flow path where hydrogen supplied from the hydrogen tank to the fuel cell flows is provided with a plurality of pressure reducing valves (regulator). The target pressure of hydrogen is set, corresponding to a required amount of power generation calculated based on an accelerator opening degree and the like. The pressure reducing valves are controlled such that the secondary pressure of the pressure reducing valves becomes the calculated target pressure.

Though different from a case of hydrogen (gas) filled in such a hydrogen tank, presented is a structure of a fuel tank having a heat radiation structure for reducing effects, on the fuel consumption and the like, of fuel vapor generated in the fuel tank reserving liquid fuel (gasoline) by entrance of heat (Japanese Patent Application Laid-Open No. 2001-130271).

DISCLOSURE OF THE INVENTION

Problems to be Solved by the Invention

However, on a fuel cell vehicle, if heat is input to a hydrogen tank by driving the vehicle under a high temperature environment in midsummer or by heat generation as described above by external units, such as a compressor, then hydrogen expands and the pressure inside the hydrogen tank increases.

In such a manner, if the pressure of hydrogen in the hydrogen tank increases, the primary pressure of the above-described pressure reducing valves also increases, and hydrogen may be supplied to the fuel cell at a pressure higher than the target pressure. If hydrogen is supplied at a high pressure in this way, it may occur that the hydrogen is not appropriately consumed by the fuel cell and exhausted outside the vehicle as it is, and the consumption efficiency of hydrogen (fuel efficiency) drops.

In this situation, although a method by mounting pressure reducing valves with a wide control range may be considered, such wide-range pressure reducing valves are extremely expensive, causing a high cost.

In this situation, an object of the present invention is to provide a gas tank in which the pressure of gas filled inside the gas tank hardly increases.

Means for Solving the Problem

In order to solve the above problems, a gas tank according to the invention includes: a container main-body into which gas is filled; a first heat insulation section provided on an outer surface of the container main-body; a fixing-member fitting region provided at a portion of the outer surface of the container main-body; a fixing member, wherein a fitting surface being a part of surfaces of the fixing member is in contact with the fixing-member fitting region, and wherein the fixing member is fixed to an external structure so that the container main-body is fixed to the external structure; and a second heat insulation section provided on a surface of the fixing member other than the fitting surface.

For such a gas tank, as the first heat insulation section is provided on the outer surface of the container main-body, the heat of an external unit (a compressor or the like) disposed in the periphery of the gas tank is insulated by the first heat insulation section.

Further, as the fitting surface being a portion of the surfaces the fixing member is in contact with the fixing-member fitting region of the container main-body and the fixing member is fixed to an external structure (a vehicle body in a later-described embodiment) so that the container main-body is fixed to the external structure through the fixing member.

Further, as the second heat insulation section is provided on a surface of the fixing member other than the fitting surface, the heat of an external unit is insulated by the second heat insulation section. That is, the heat of an external unit hardly transfers inside the second heat insulation section and the fixing member, thereby being inhibited from being input to the container main-body.

In such a manner, as the heat of an external unit is insulated by the first heat insulation section provided on the outer surface of the container main-body and the second heat insulation section provided on the surface of the fixing member other than the fitting surface, the temperature of the gas filled in the container main-body hardly increases. Thus, the gas hardly expands, in other words, the volume of the gas hardly increases, and the pressure of the gas in the container main-body hardly increases.

Such a first heat insulation section and a second heat insulation section can be, as described later in an embodiment, easily formed at a low cost compared with the above-described wide-range pressure reducing valve, which enables manufacturing a gas tank at a low cost.

Further, for the above-described gas tank, the first heat insulation section and the second heat insulation section are layers that are formed by coating thermal-foam heat-insulation coating material in a liquid state or a gel state and foam by an increase in temperature to become a heat insulation layer.

For such a gas tank, the first heat insulation section and the second heat insulation section can be easily formed by just coating thermal-foam heat-insulation coating material in a liquid state or a gel state.

Still further, for the above-described gas tank, the first heat insulation section is a layer that is formed by coating thermal-foam heat-insulation coating material in a liquid state or a gel state on the container main-body, and foams by an increase in temperature to become a heat insulation layer, and the second heat insulation section is formed by a heat insulation member being a solid object fixed to the fixing member.

For such a gas tank, the first heat insulation section can be easily formed by coating thermal-foam heat-insulation coating material in a liquid state or a solid state, and the second heat insulation section can be easily formed by fixing a heat insulation member (a heat insulation component having heat insulation properties) being a solid object to the fixing member.

Yet further, the above-described gas tank is mounted on a fuel cell vehicle having a fuel cell, and the gas is fuel gas supplied to the fuel cell.

For such a gas tank, as the pressure of the fuel gas filled in the container main-body hardly increases, the primary pressure of the pressure reducing valve unit (regulator) provided between the gas tank and the fuel cell hardly changes a great deal with a change in the temperature.

Accordingly, the pressure reducing valve unit can be easily controlled so that the pressure becomes the target pressure calculated, based on the accelerator opening degree and the like. Accordingly, it is prevented that fuel gas is excessively supplied and the fuel gas is exhausted as it is without being consumed by the fuel cell. Thus, the consumption efficiency of fuel gas, in other words, the fuel efficiency of the fuel cell vehicle is also improved.

Advantages of the Invention

According to the present invention, it is possible to provide a gas tank in which the pressure of filled gas hardly increases. The various aspects, advantages in the aspects, other advantages, and further features of the invention will be made further clearer by later detailed description of an exemplary and non-limiting embodiment of the present invention, referring to the attached drawings.

BRIEF DESCRIPTION OF THE DRAWINGS

FIG. 7 is a diagram according to a modified example and corresponding to the enlarged view of the portion A shown in FIG. 4; and FIG. 8 is a cross-sectional view, taken along the ring-shaped cut direction, of a hydrogen tank according to the modified example.

EMBODIMENT FOR CARRYING OUT THE INVENTION

Figure 1:
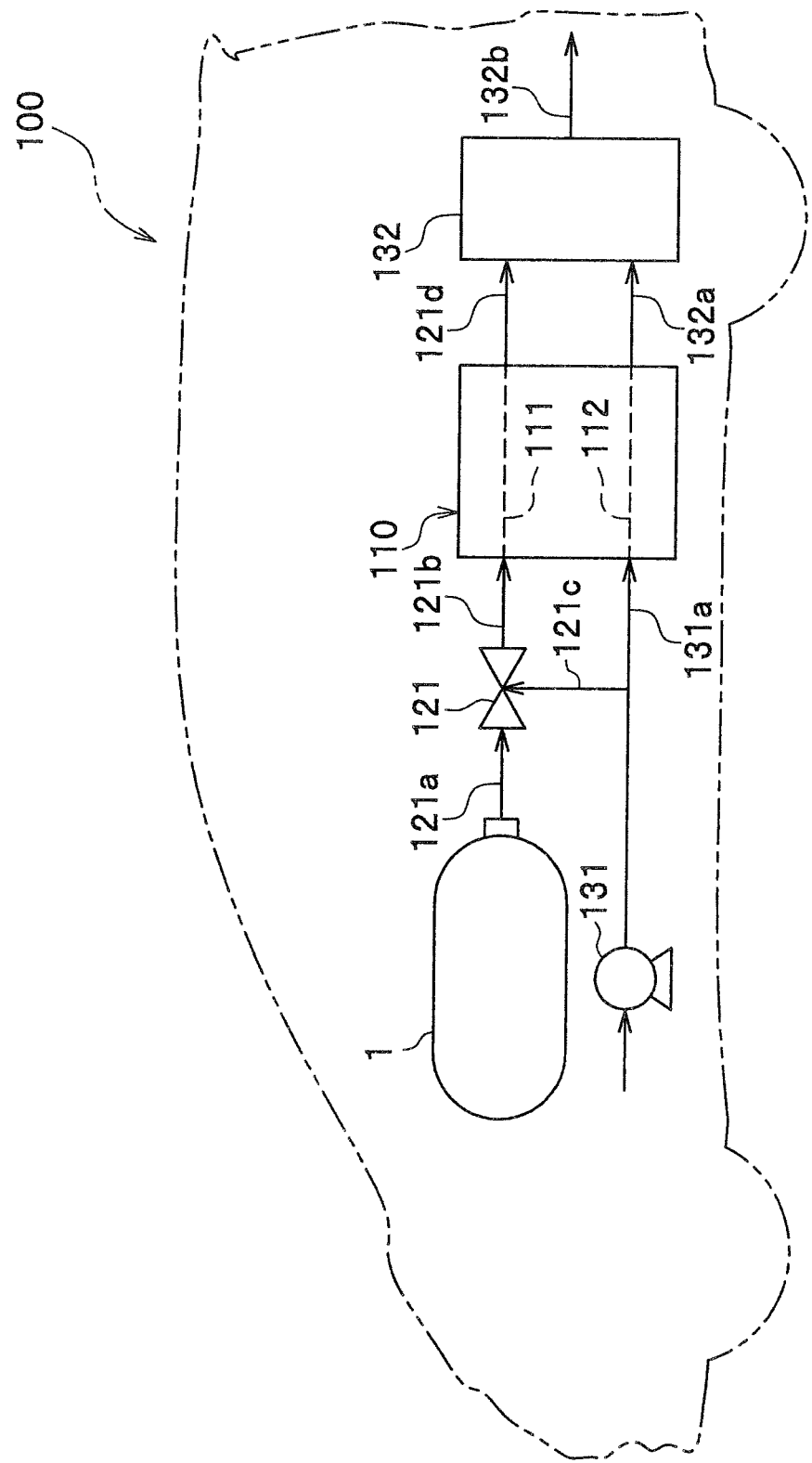
FIG. 1 is a side view of a fuel cell vehicle according to the present embodiment.

An embodiment according to the present invention will be described below, referring to FIGS. 1 to 6.
<Structure of Fuel Cell Vehicle>
A fuel cell vehicle 100 (automobile, mobile body) according to the present embodiment includes a fuel cell stack 110 (fuel cell), a hydrogen tank 1 (gas tank), a pressure reducing valve unit 121, a compressor 131, and a dilution unit 132.

Concrete kinds of the fuel cell vehicle 100 include, for example, four-wheel vehicles, three-wheel vehicles, two-wheel vehicles, unicycles, and trains.

The fuel cell stack 110 is a solid polymer fuel cell (Polymer Electrolyte Fuel Cell: PEFC) and is arranged by laminating a plurality of unit cells each of which is formed by sandwiching an MEA (Membrane Electrode Assembly) by separators (not shown). The MEA includes an electrolyte membrane (solid polymer membrane), and a cathode and an anode which sandwich the electrolyte membrane. Each of the separators is provided with an anode flow path 111 (fuel gas flow path) and a cathode flow path 112 (oxidant gas flow path) which are formed as a channel or a penetration hole.

The hydrogen tank 1 is a tank into which hydrogen (fuel gas) to be supplied to the anode flow path 111 is filled. The hydrogen tank 1 is connected with the inlet of the anode flow path 111 through a pipe 121a, a pressure reducing valve unit 121 (regulator), and a pipe 121b, wherein the hydrogen in the hydrogen tank 1 is supplied to the anode flow path 111 through the pipe 121a and the like.

That is, the pipe 121a and the pipe 121b form a hydrogen supply flow path (fuel gas supply flow path), and the hydrogen supply flow path is provided with the pressure reducing valve unit 121. Further, the hydrogen supply flow path is also provided with a normally-closed shutoff valve unit that is controlled to open and close by an ECU (Electronic Control Unit), not shown. The pressure reducing valve unit and the shutoff valve unit are respectively arranged in a plural number of valves such that, for example, a primary shutoff valve, a primary pressure reducing valve, a secondary shutoff valve, and a secondary pressure reducing valve in this order from the upstream side to the downstream side.

For example, as described in Japanese Patent Application Laid-Open No. 2004-185831 applied by the applicant of the present application, the pressure reducing valve unit 121 is used to decrease the pressure of hydrogen, based on a pilot pressure that is input from the pipe 121c, so that the pressure of the hydrogen in the anode flow path 111 and the pressure of the air in the cathode flow path 112 are balanced. The upstream end of the pipe 121c is connected with a pipe 131a through which air flows toward the cathode flow path 112.

The outlet of the anode flow path 111 is connected with the dilution unit 132 through a pipe 121d. Anode-off gas exhausted from the anode flow path 111 is exhausted through the pipe 121d to the dilution unit 132.

The compressor 131 is connected through the pipe 131a to the inlet of the cathode flow path 112. When the compressor 131 is operated upon instruction from the ECU, the compressor 131 takes in air containing oxygen and compresses the air to transport the air with pressure to the cathode flow path 112. The power source for the compressor 131 is the fuel cell stack 110 or a high voltage battery (not shown).

Further, the compressor 131 is a heat source that generates operation heat through operation. In the present embodiment, a case that the operation heat partially transfers to the hydrogen tank 1 will be described as an example. That is, for the hydrogen tank 1, the compressor 131 is an external unit that generates heat. In addition to the compressor 131, external units that likewise generate heat include various units, such as the ECU, a refrigerant pump, a high voltage battery, a PDU, a drive train.

The outlet of the cathode flow path 112 is connected through a pipe 132a to the dilution unit 132. Cathode-off gas exhausted from the cathode flow path 112 is exhausted through the pipe 132a to the dilution unit 132.

The pipe 132a is provided with a normally-closed back-pressure valve (not shown) whose opening degree is controlled by the ECU. That is, the ECU calculates a required amount of heat generation, a target air pressure, and a target hydrogen pressure, based on an accelerator opening degree, in order to control the opening degree of the back-pressure valve and the rotation speed of the compressor 131 so that target air pressure is attained.

The dilution unit 132 is used to dilute the hydrogen in the anode-off gas from the pipe 121d with the cathode-off gas from the pipe 132a and thereby decrease the hydrogen concentration, and has a dilution space therein. The gas after the dilution is exhausted through a pipe 132b to outside the vehicle.

<Structure of Hydrogen Tank>

The concrete structure of the hydrogen tank 1 will be described below, referring to FIGS. 2 to 6.

Figure 2:
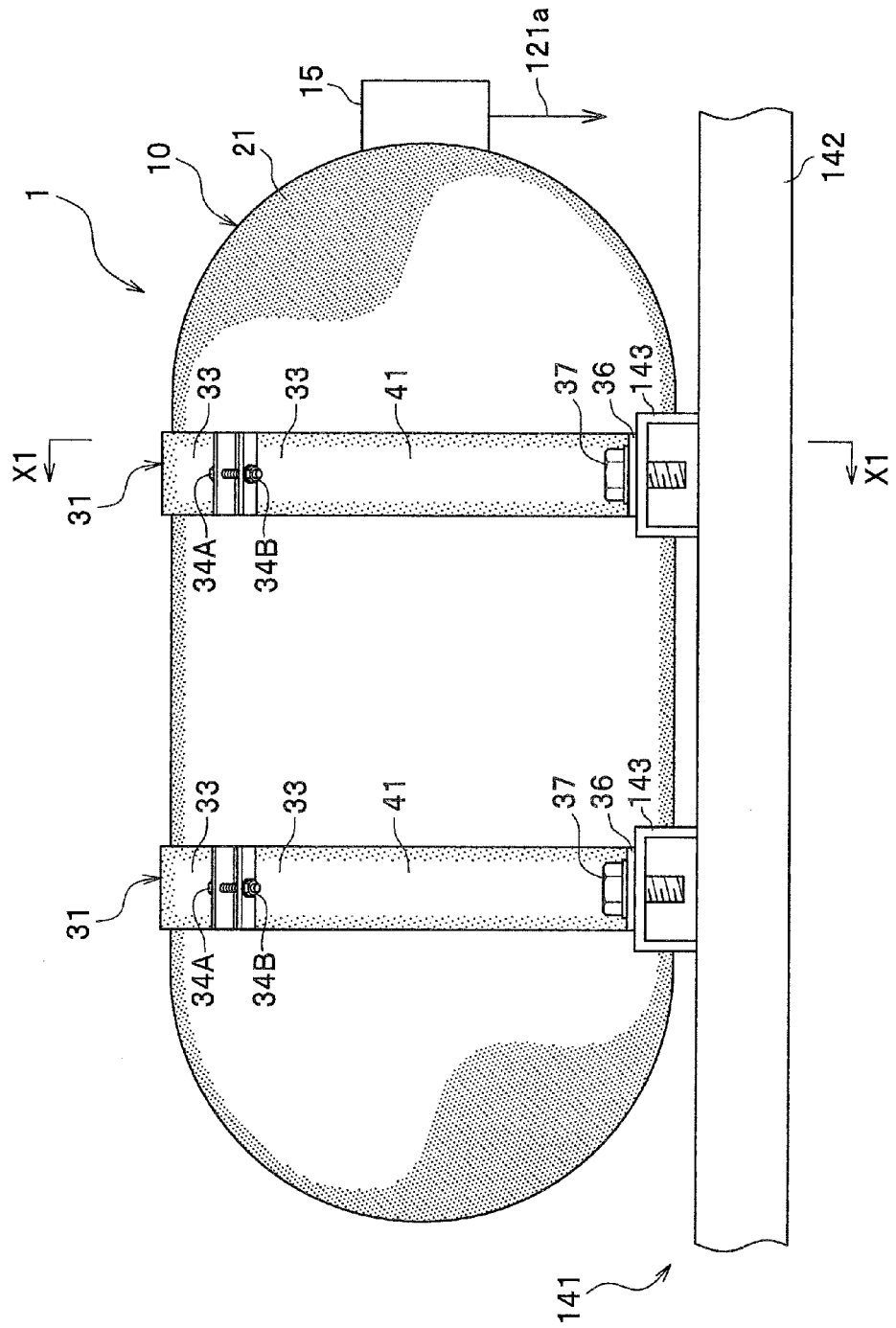
FIG. 2 is a side view of a hydrogen tank according to the present embodiment.
Figure 3:
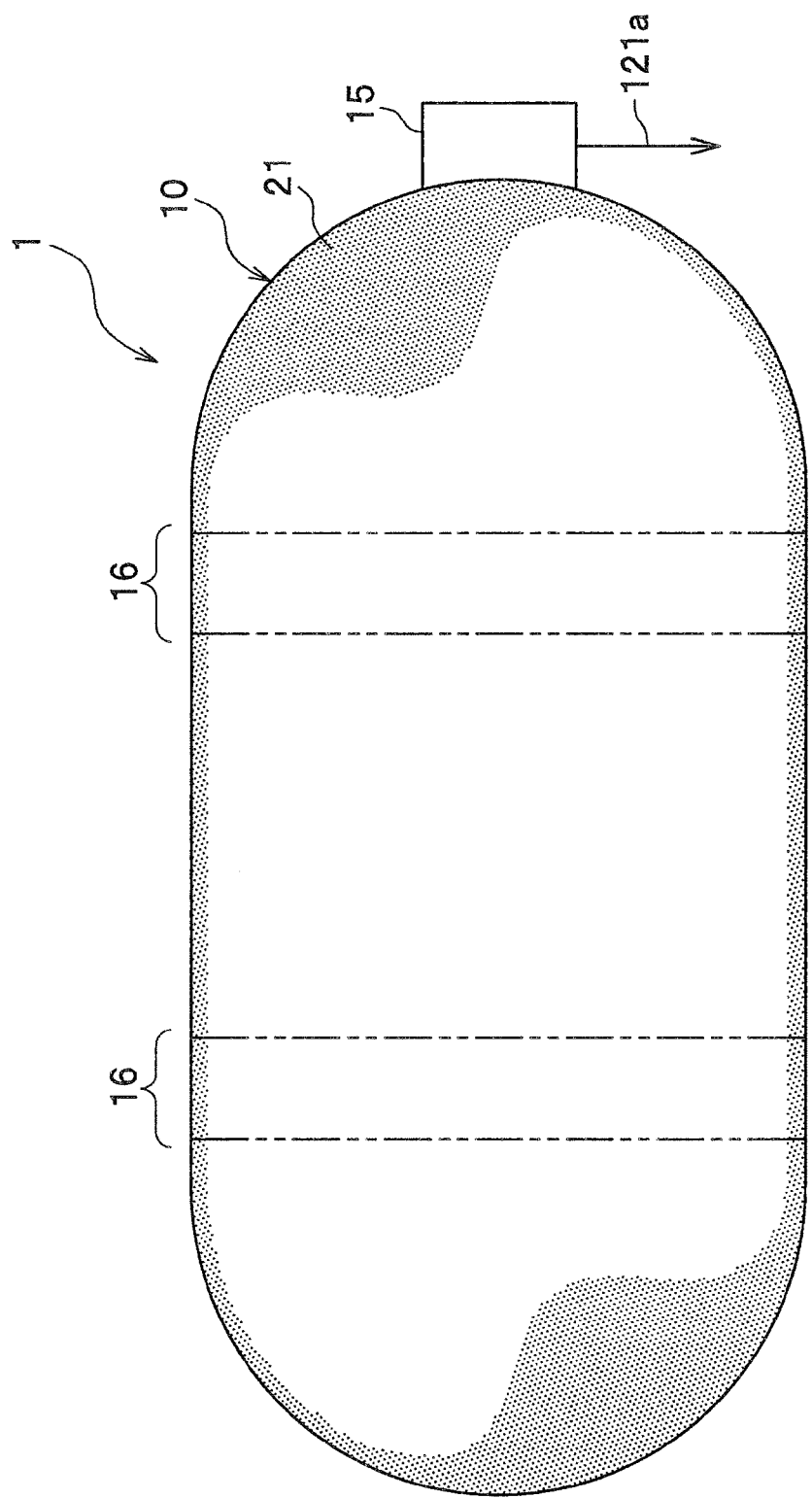
FIG. 3 is a side view of the hydrogen tank according to the present embodiment, wherein belts are not shown.
Figure 4:
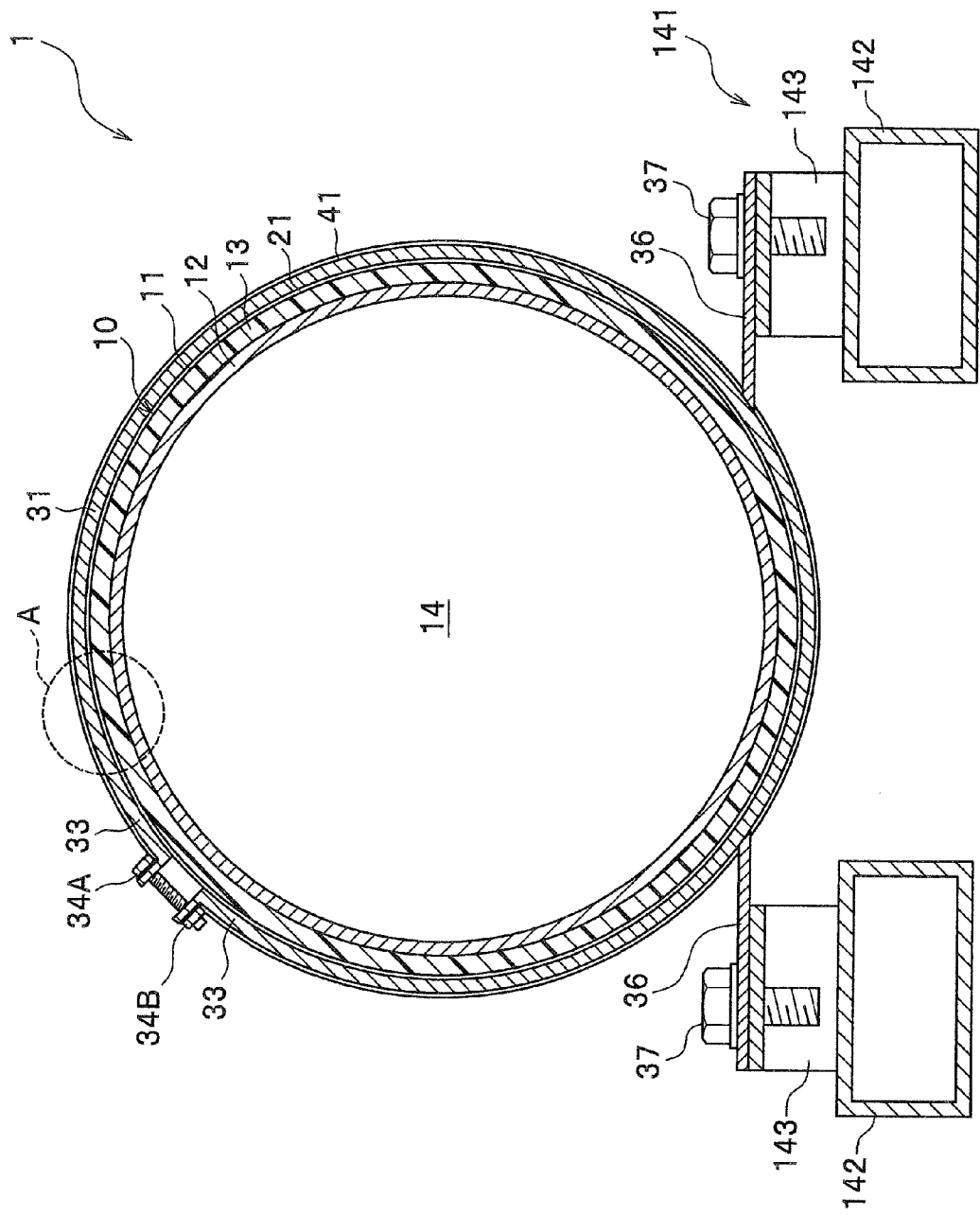
FIG. 4 is a cross-sectional view (a cross-sectional view taken along line X1-X1 in FIG. 2), taken along a ring-shaped cut direction, of the hydrogen tank according to the present embodiment.

As shown in FIGS. 2 to 4, the hydrogen tank 1 has an outer shape that is substantially a cylinder, and is mounted, being laid, on the fuel cell vehicle 100 (refer to FIG. 1).

The hydrogen tank 1 includes a container main-body 10 into which hydrogen is filled, a first thermal-foam heat insulation layer 21 (the first heat insulation section) provided on the entire outer surface 11 of the container main-body 10, two belts 31, 31 (fixing members) for fixing the container main-body 10, and second thermal-foam heat insulation layers 41 (the second heat insulation sections) provided on the surfaces 32 (other than the fitting surfaces) of the respective belts 31.

<Container Main-Body>

The container main-body 10 includes a liner 12 of aluminum alloy, and a CFRP layer 13 (Carbon Fiber Reinforced Plastic layer) for reinforcing the liner 12 provided on the outer surface of the liner 12, wherein the inside of the liner 12 forms a tank chamber 14 into which hydrogen is filled. The cap portion (not shown) of the liner 12 is screw-engaged with a valve device 15 having a built-in in-tank electromagnetic valve (primary shutoff valve) that is controlled to open and close by the ECU (refer to FIGS. 2 and 3).

The CFRP layer 13 is obtained by winding long carbon fibers, which are impregnated with thermoset resin, around the liner 12 and thereafter curing the thermoset resin.

The concrete structure of the container main-body 10 is not limited to such a double structure of the liner 12 and the CFRP layer 13, and may be, for example, a single structure formed only by a liner of synthetic resin or metal.

<First Thermal-Foam Heat Insulation Layer>

The first thermal-foam heat insulation layer 21 is a layer with a component of a foaming agent, for example, poly ammonium phosphate, and is a layer that is heated from outside to increase the temperature thereof, and foams by generating gas when the temperature reaches the foaming temperature, thereby forming the first heat insulation layer (foam layer) in which a number of gas bubbles are formed. Such a first thermal-foam heat insulation layer 21 can be easily formed by coating thermal-foam heat-insulation coating material in a liquid state or a gel state, which is known and has a component of a foaming agent, for example, poly ammonium phosphate, on the entire outer surface 11 of the container main-body 10.

The foaming temperature of the first thermal-foam heat insulation layer 21 can be appropriately changed in designing by changing the foaming agent for generating gas with an increase in the temperature. That is, the foaming temperature of the first thermal-foam heat insulation layer 21 can be appropriately changed in designing, corresponding to the temperatures of external units that generate heat, such as the compressor 131.

Further, the first thermal-foam heat insulation layer 21 may have a multi-layer structure with different foaming temperatures without being limited to a single layer structure. Still further, a basecoat layer may be arranged between the first thermal-foam heat insulation layer 21 and the container main-body 10, and an overcoat layer may be formed on the first thermal-foam heat insulation layer 21.

<Belt>

The two belts 31 are in a band shape for fixing the container main-body 10 to a vehicle body 141 (external or peripheral member) of the fuel cell vehicle 100, and are formed by a durable metal in the present embodiment. The respective belts 31 are wound, over the first thermal-foam heat insulation layer 21, in the circumferential direction around the container main-body 10, while the both end portions 33, 33 of the respective belts 31 are fastened by bolts 34A and nuts 34B so that the respective belts 31 are fixed to the container main-body 10.

That is, the outer surface 11 of the container main-body 10 is partially and virtually provided with two belt fitting regions 16 (fixing member fitting regions) in the circumferential direction in which the two belts 31, 31 are wound (fitted) (refer to FIG. 3). Further, the back surfaces 35 (fitting surfaces, refer to FIG. 4) being a part of the surfaces of the belts 31 are in contact with the respective belt fitting regions 16 through the first thermal-foam heat insulation layer 21. Accordingly, the portions, of the first thermal-foam heat insulation layer 21, formed in the belt fitting regions 16 are sandwiched between the container main-body 10 and the belts 31.

Otherwise, arrangement may be made such that the first thermal-foam heat insulation layer 21 is bot formed in the belt fitting regions 16 and the back surfaces 35 of the respective belts 31 directly contact the belt fitting regions 16. Further, the winding direction of the belts 31 is not limited to the circumferential direction of the container main-body 10, and the belts 31 may be wound, for example, obliquely with respect to the container main-body 10, or may be wound along the longitudinal circumference of the container main-body 10 being laid.

At appropriate portions of the respective belts 31, two fitting pieces 36, 36 are integrally formed by welding or the like. The respective fitting pieces 36 are fastened by bolts 37 to fitting seats 143 provided on a cross member 142 of the vehicle body 141, and the container main-body 10 is thereby fixed to the vehicle body 141.

<Second Thermal-Foam Heat Insulation Layer>

Figure 5:
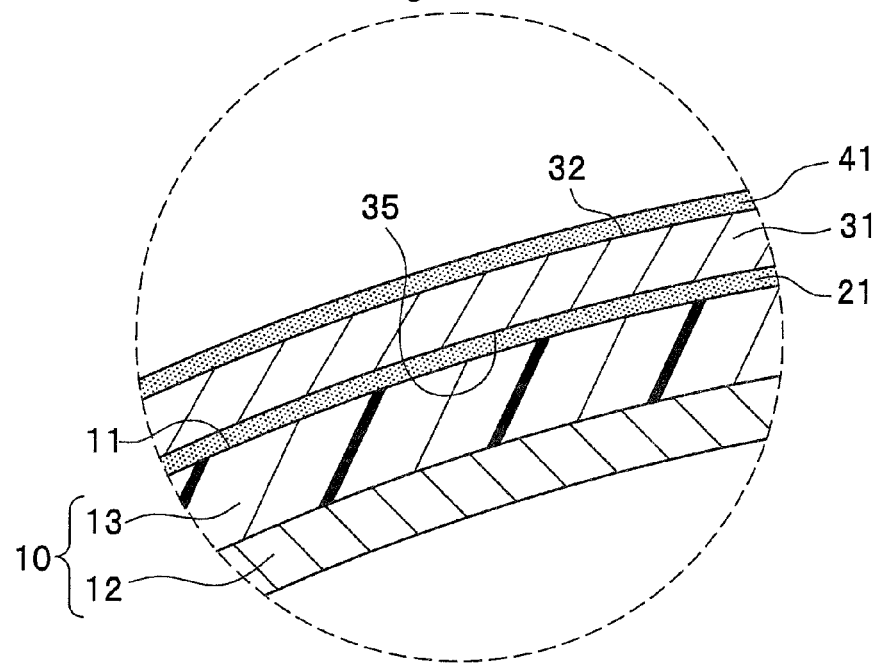
FIG. 5 is an enlarged view of the portion A shown in FIG. 4, showing a second thermal-foam heat insulation layer 41 in a normal state (before foaming)
Figure 6:
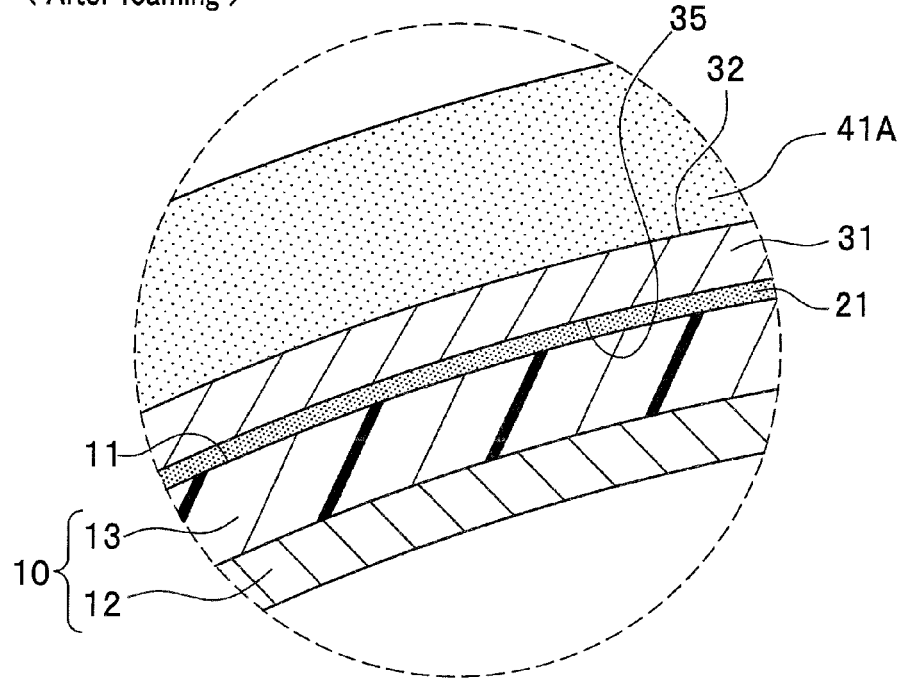
FIG. 6 is an enlarged view of the portion A shown in FIG. 4, showing a state that the second thermal-foam heat insulation layer 41 has foamed and a second heat insulation layer 41A is formed.

The second thermal-foam heat insulation layers 41, 41 are, as shown in FIG. 5, layers in a band shape provided on the surfaces 32 of the respective belts 31. Similarly to the first thermal-foam heat insulation layer 21, each second thermal-foam heat insulation layer 41 is a layer that foams by generating gas with an increase in temperature when heated from outside, and forms a second heat insulation layer 41A (foaming layer) in which a number of gas babbles are formed (refer to FIG. 6). The concrete composition and the forming method of each second thermal-foam heat insulation layer 41 is similar to those of the first thermal-foam heat insulation layer 21, and accordingly description thereof is omitted here.

<Operation and Effects of Hydrogen Tank>

The following operation and effect can be obtained by the hydrogen tank 1 arranged as above.

When the temperature of the first thermal-foam heat insulation layer 21 increases up to a certain foaming temperature by the operation heat of the compressor 131 and the like, the first thermal-foam heat insulation layer 21 foams to become the first heat insulation layer. Further, the second thermal-foam heat insulation layers 41 also foam when the temperature increases up to a certain foaming temperature to become the second heat insulation layers 41A (refer to FIG. 6).

That is, the container main-body 10 becomes in a state of being covered by the first heat insulation layer and the second heat insulation layers 41A, and the operation heat of the compressor 131 and the like is insulated by the first heat insulation layer and the second heat insulation layers 41A to thereby hardly transfer to the container main-body 10 so that the temperature of filled hydrogen also hardly increases.

That is, although the portions of the first thermal-foam heat insulation layer 21 in the belt fitting regions 16 are sandwiched between the respective belts 31 and the container main-body 10 and hardly foam, the second thermal-foam heat insulation layers 41 provided on the surfaces 32 of the belts 31 foam to form the second heat insulation layers 41A. Thus, the operation heat is thermally insulated by the second thermal-foam heat insulation layers 41, and does not transfer through the belts 31 to the container main-body 10.

In such a manner, as the temperature of the filled hydrogen hardly increases and the hydrogen hardly expands, the pressure of the hydrogen inside the hydrogen tank 1 hardly increases. Accordingly, the primary pressure of the pressure reducing valve unit 121, shown in FIG. 1, does not increase by the effect of the operation heat of the compressor 131 and the like.

Therefore, it is not necessary to provide a wide-range pressure reducing valve unit 121 with a wide range of control, which enables manufacturing of the fuel cell vehicle 100 at a low cost. The pressure reducing valve unit 121 can appropriately decrease and adjust the pressure of hydrogen so that the hydrogen is supplied to the anode flow path 111 with an appropriate pressure and deterioration of the fuel cell stack 110 due to excessive supply of hydrogen can also be prevented. Further, the hydrogen is restricted from passing the fuel cell stack 110 as it is, and the fuel efficiency of the fuel cell vehicle 100, in other words, the consumption efficiency of hydrogen is increased.

One embodiment according to the present invention has been described above, however, the invention is not limited thereto, and modifications and changes can be made without departing from the spirit of the invention, for example as follows.

Although, in the forgoing embodiment, a structure where the second thermal-foam heat insulation layers 41 are provided on the surfaces 32 of the belts 31 (refer to FIG. 5) has been described as an example, arrangement may be made, as shown in FIG. 7, such that heat insulation members 42 (heat insulation components, the second heat insulation sections) being a solid object with heat insulation properties are originally stuck, in other words, adhered and fixed to the surfaces 32 of the belts 31 by an adhesive agent or the like.

For such a structure, the coating process of the thermal-foam heat-insulation coating material for forming the second thermal-foam heat insulation layers 41 can be omitted, and the hydrogen tank 1 can be obtained by carrying out an adherence process of heat insulation members 42 that is easier than the above-described coating process.

Further, the method of fixing the heat insulation members 42 is not limited to a method of adherence fixing by an adhesive agent or the like, and may be, for example, a method of fixing by bolts. Still further, a method may be employed where clicks are formed on the heat insulation members 42 and the heat insulation members 42 are snap-fit joined with the container main-body 10 by the clicks.

Although, in the forgoing embodiment, a structure where the container main-body 10 is fixed to the vehicle body 141 by the belts 31 has been described as an example, arrangement may be made, as shown in FIG. 8, such that the container main-body 10 is fixed to the vehicle body 141 by sandwiching the container main-body 10 with a seat 61 and an urging jig 65 (Both are fixing members). In more details, the seat 61 is fixed to cross members 142 by bolts 62, 62, and the urging jig 65 is attachably/detachably fixed by bolts 66, 66 to brackets 144, 144 integrated with the vehicle body 141.

The upper surface of the seat 61 is provided with a fitting surface 63 that is downward recessed corresponding to the outer shape of the container main-body 10, and the fitting surface 63 is in contact, through the first thermal-foam heat insulation layer 21, with a seat fitting region 38A (fixing member fitting region) that is in a band shape and virtually arranged on the lower portion of the outer circumferential surface of the container main-body 10.

Further, the lower surface of the urging jig 65 is provided with a fitting surface 67 that is upward recessed corresponding to the outer shape of the container main-body 10, and the fitting surface 67 is in contact, through the first thermal-foam heat insulation layer 21, with an urging jig fitting region 38B (fixing member fitting region) that is in a band shape and virtually arranged on the upper portion of the outer circumferential surface of the container main-body 10.

A second thermal-foam heat insulation layer 64 (second heat insulation section) is provided, by coating thermal-foam heat-insulation coating material, on the surfaces (the both side surfaces, the both end surfaces, the lower surface, and the like) of the seat 61 other than the fitting surface 63. A second thermal-foam heat insulation layer 68 is provided on the surfaces (the both side surfaces, the both end surfaces, the upper surface, and the like) of the urging jig 65 other than the fitting surface 67.

When the temperature increases up to a certain foaming temperature by the operation heat of the compressor 131 and the like, the second thermal-foam heat insulation layer 64 and the second thermal-foam heat insulation layer 68 respectively foam to form heat insulation layers. The operation heat of the compressor 131 and the like is thus appropriately insulated by the heat insulation layers so as to be prevented from transferring in the seat 61 and the urging jig 65.

Although, in the foregoing embodiment, an arrangement where hydrogen is filled has been described as an example, the kind of gas to be filled may be another kind, for example, oxygen, nitrogen, or natural gas (methane).

Although, in the foregoing embodiment, the first thermal-foam heat insulation layer 21 (first heat insulation section) is provided on the outer surface 11 of the container main-body 10, a different arrangement may be made. For example, a heat insulation member similar to the heat insulation members 42 (refer to FIG. 7) may be fixed to the outer surface 11 to serve as the first heat insulation section.

Although, in the foregoing embodiment, a structure in which the hydrogen tank 1 is mounted on the fuel cell vehicle 100 has been described as an example, the place for using the hydrogen tank 1 is not limited thereto, and the hydrogen tank 1 may be incorporated, for example, in a fuel cell system that is mounted on a vessel or an aircraft, or in a stationary fuel cell system.

Further, the gas may be natural gas, and a tank may be mounted on a CNG (Compressed Natural Gas) vehicle, or may be filled with gas fuel and used for an internal-combustion engine or an external-combustion engine.

REFERENCE SYMBOLS

1 . . . hydrogen tank (gas tank)
10 . . . container main-body
11 . . . outer surface
16 . . . belt fitting region (fixing member fitting region)
21 . . . first thermal-foam heat insulation layer (first heat insulation section)
31 . . . belt (fixing member)

32 ... surface (surface other than fitting surface)
35 ... back surface (fitting surface)
38A ... seat fitting region (fixing member fitting region)
38B ... urging jig fitting region (fixing member fitting region)
41 ... second thermal-foam heat insulation layer (second heat insulation section)
41A ... second heat insulation later
42 ... heat insulation member (second heat insulation section)
61 ... seat (fixing member)
65 ... urging jig (fixing member)
100 ... fuel cell vehicle
110 ... fuel cell stack (fuel cell)
141 ... vehicle body (external)

The invention claimed is:

1. A gas tank for a high-pressure gas, comprising:
a container main-body into which the high-pressure gas is filled;
a first heat insulation section provided on an outer surface of the container main-body;
a fixing-member fitting region provided at a portion of the outer surface of the container main-body;
a fixing member, wherein a fitting surface being a part of surfaces of the fixing member is in contact with the fixing-member fitting region, the fixing member is fixed to an external structure so that the container main-body is fixed to the external structure, and the first heat insulation section is sandwiched between the fixing member and the container main-body; and
a second heat insulation section that is provided on a surface of the fixing member other than the fitting surface and covers only the surface of the fixing member, wherein the second heat insulation section is a layer comprising a thermal-foam heat-insulation coating material, and the second heat insulation section foams by an increase in temperature to become a heat insulation layer.

2. The gas tank according to claim 1, wherein the first heat insulation section is a layer that is formed by coating thermal-foam heat-insulation coating material in a liquid state or a gel state and foams by an increase in temperature to become a heat insulation layer.

3. The gas tank according to claim 1,
wherein the first heat insulation section is a layer that is formed by coating thermal-foam heat-insulation coating material in a liquid state or a gel state on the container main-body, and foams by an increase in temperature to become a heat insulation layer,
and wherein the second heat insulation section is formed by a heat insulation member being a solid object fixed to the fixing member.

4. The gas tank according to any one of claims 1 to 3,
wherein the gas tank is mounted on a fuel cell vehicle having a fuel cell,
and wherein the gas is fuel gas supplied to the fuel cell.

* * * * *